H. C. BROOKS.
BICYCLE PUMP.
APPLICATION FILED JAN. 17, 1908.
905,642.
Patented Dec. 1, 1908.
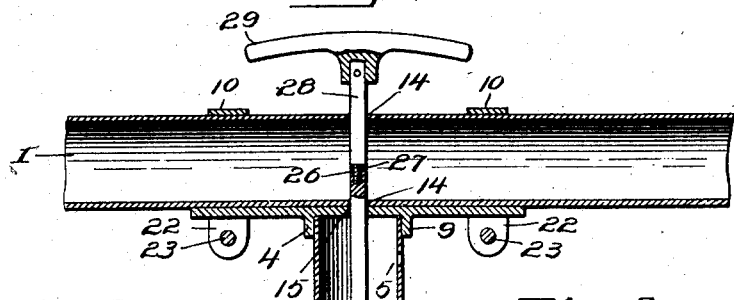
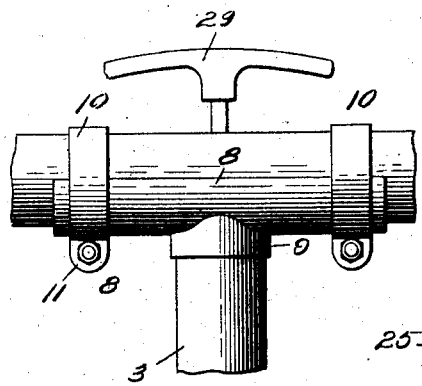
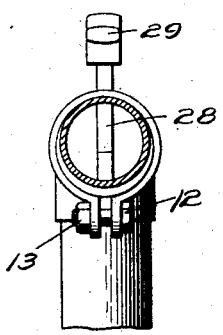
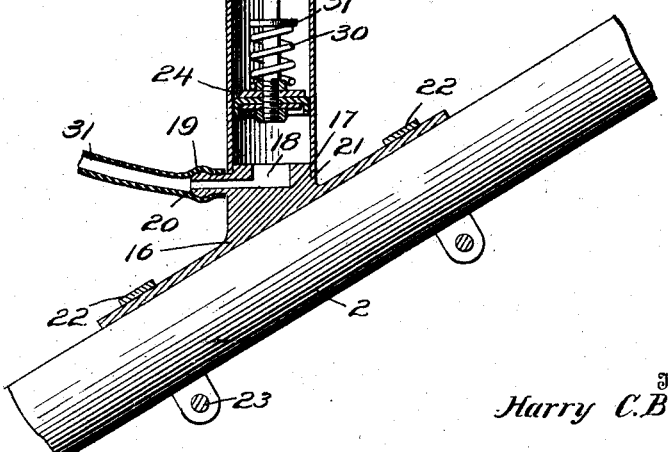
Witnesses
F. C. Gibson.
Wm. Koerth.
Inventor
Harry C. Brooks.
By Victor J. Evans
Attorney
THE NORRIS PETERS CO., WASHINGTON, D. C.

UNITED STATES PATENT OFFICE.

HARRY C. BROOKS, OF SAN JOSE, CALIFORNIA.

BICYCLE-PUMP.

No. 905,642.    Specification of Letters Patent.    Patented Dec. 1, 1908.

Application filed January 17, 1908. Serial No. 411,357.

*To all whom it may concern:*

Be it known that I, HARRY C. BROOKS, a citizen of the United States, residing at San Jose, in the county of Santa Clara and State of California, have invented new and useful Improvements in Bicycle-Pumps, of which the following is a specification.

This invention relates to bicycle pumps, and the object of the invention is to provide a bicycle frame of the ordinary construction with a pumping cylinder having a plunger and plunger rod positioned upon the frame of the bicycle within easy reach of the rider.

A further object of the invention is to provide a bicycle pump which may be easily applied upon the frame of any bicycle, which may be readily detached and removed from the frame when desired, and which when in position upon the frame of the wheel occupies a comparatively small space and in no wise interferes with the rider manipulating the machine, and acts as a brace for the parts of the frame between which it is positioned.

In the drawing, Figure 1 is a sectional view of my improved pump showing its position upon the frame of a wheel. Fig. 2 is a side elevation of a portion of the horizontal bar of a bicycle frame illustrating the pump coupling and handle for operating the pump, and Fig. 3 is a sectional view upon the line 3—3 of Fig. 2 and looking in the direction of the arrows.

In the accompanying drawing the numeral 1 designates a portion of the horizontal bar of an ordinary bicycle frame and 2 the inclined reach or brace bar thereof.

My improved bicycle pump is adapted to be positioned upon the frame of a bicycle between the horizontal bar and the reach bar, and comprises a cylindrical air chamber 3 having its upper end screw threaded as at 4, and provided with an air inlet opening 5. A coupling 8 comprising a semi-circular body portion of a suitable length and provided with a centrally located screw threaded lip 9 adapted to engage with the threads 4 upon the chamber 3 is positioned upon the horizontal bar 1 of the bicycle and securely retained thereon by a pair of clips 10 having perforated ears 11 adapted for the reception of a bolt 12 having a nut 13 engaging the screw threaded portion of the bolt and adapted to securely retain the clips and coupling 8 upon the bar 1 of the bicycle frame. The horizontal bar 1 is provided with the vertical openings 14 adapted to aline with the opening 15 centrally located within the lip 9 of the coupling 8.

The reach bar 2 of the frame is provided with a semi-circular angularly disposed coupling 16 having a vertically extending portion 17 centrally located upon the body of the coupling. The projecting portion 17 is provided with a centrally located air passage 18 and a horizontally extending nipple 19 having a passage 20 communicating with the passage 18 within the extending portion 17 of the coupling. The extension 17 is provided upon its outer periphery with an annular reduced portion providing a shoulder 21 adapted for the reception of the lower extremity of the pump chamber 3. The coupling 16 is retained upon the reach bar 2 of the frame by a pair of clips 22, of a similar construction to the clips 10 of the upper coupling, and is provided with the retaining elements 23 by which the coupling 16 is securely retained upon the reach bar.

Positioned within the chamber 3 is a plunger 24 of any desired or preferred construction, and threadedly engaged with the plunger is a cylindrical plunger rod 25, of a length equaling the distance between the face of the extension 17 upon the coupling 16 and the top portion of the lower wall of the coupling 8. The upper extremity of the plunger rod 25 is provided with internally screw threaded recess 26, adapted for the reception of a reduced screw-threaded portion 27 of a plunger rod extension 28. The plunger rod extension 28 is provided with a suitable handle 29 by which the pump may be operated when the extension is threaded upon the plunger rod 25. Around the plunger rod 25, and directly above the plunger 24 is positioned a helical spring 30 having its upper extremity provided with a washer 31, also encircling the plunger rod 25. The object of the spring 30 and washer 31 is to afford an efficient buffer for the plunger when it is brought to its extreme upward position.

A suitable flexible tube 31 is secured upon the nipple 19 of the extension 17 of the coupling 16, and is adapted to be normally wound around and retained upon the outer casing of the chamber 3. When air is to be forced into either of the bicycle wheels, the flexible tubing 31 is unwound from its position upon the casing and a suitable coupling provided with the ordinary tubings connected with bicycle pumps is inserted over the valve of the bicycle wheel, and, after the stopper 6 is removed from the chamber 3, the plunger rod 25 is reciprocated and air forced by the plunger 20 through the tubing 31 into the deflated tire. When the tire is sufficiently inflated the flexible tubing 31 is removed from the valve of the tire and replaced upon the cylinder 3, or if preferred upon any other desirable portion of the bicycle frame.

In assembling the parts of my improved pump upon the frame of a bicycle the chamber 3 is positioned upon the coupling 8 and the clips 10 secured around the coupling and the horizontal bar of the frame, the retaining elements 12 and 13 being loosely positioned upon the ears of the clips so as to allow for the free sliding of the clip upon the horizontal bar. The extension 28, of the plunger rod 25, it will be understood, is disconnected from the plunger rod when the parts are assembled, and the plunger and plunger rod are now inserted into the chamber 3. The lower coupling 16 is now placed upon the reach bar 2, the retaining elements 23 being loosened to provide for the sliding movement of the coupling. The couplings are now forced forward, the under coupling engaging the lower portion of the chamber 3 at a point near the perforations or openings provided within the horizontal bar 1 of the frame. When the opening 15 of the threaded lip 9 of the upper coupling 8 alines with the openings 14 of the horizontal bar of the frame, the cylinder 3 is brought tightly into engagement upon the shoulders 21 of the extension 17 upon the lower coupling, and the retaining elements connecting the lips of the upper and lower couplings are tightened and the device securely positioned upon the frame. When the parts are thus arranged, the plunger rod extension 28 is inserted within the openings 14 of the horizontal bar of the frame and the reduced threaded extremity 27 secured within the threaded recess 26 upon the upper extremity of the plunger rod 25, and the flexible tubing 31 positioned upon the nipple 19, the pump being thus secured in operative position upon the bicycle frame.

From the above description it will be observed that I have provided a bicycle frame with a pumping device conveniently located upon the frame, which is within easy reach of the rider, and which acts as an additional support for the horizontal bar and brace bar of the frame, the parts of which are so constructed as to be readily applicable to any ordinary bicycle frame and which may be easily and quickly removed from the frame for repairs or other causes when desired.

While I have described the preferred embodiment of the invention as it now appears to me, it will be understood that minor details of construction within the scope of the following claims may be resorted to without departing from or sacrificing any of the advantages of the invention.

Having thus fully described the invention what is claimed as new is:

1. A bicycle frame having a coupling upon its horizontal bar, and a coupling having an outlet passage upon the reach bar of the bicycle frame, a pump cylinder secured to the couplings, a plunger and a plunger rod within the cylinder, an air inlet provided upon the cylinder, and a handle for reciprocating the plunger rod.

2. A bicycle frame having a coupling upon its horizontal bar, and a coupling having an outlet passage upon the reach bar of the bicycle frame, a flexible tubing secured to the said outlet passage, a pump cylinder positioned between the couplings, a plunger within the cylinder, a plunger rod upon said plunger, a buffer upon the rod, and an operating handle upon the rod.

3. A bicycle frame having its horizontal bar provided with vertical openings, a coupling for the horizontal bar having a centrally located depending lip and being provided with openings alining with the openings in the horizontal bar, a coupling having an outlet passage and a flexible tubing secured to the outlet passage provided by the coupling secured upon the reach bar of the frame, a cylinder secured above the outlet passage of the coupling of the reach bar and to the depending lip of the coupling of the horizontal bar of the frame, a plunger within the cylinder, a plunger rod having a screw threaded recess upon its upper end secured to the plunger and adapted to be of a length corresponding with the height of the chamber and the thickness of the coupling for the horizontal bar, a buffer upon the rod, and a rod extension comprising a handle and a depending rod provided with threads adapted to engage the threaded recess provided by the plunger rod.

In testimony whereof I affix my signature in presence of two witnesses.

HARRY C. BROOKS.

Witnesses:
 GEORGE T. LEMON,
 THOMAS COSTAIN.